(12) United States Patent
Senturk (10) Patent No.: US 11,741,134 B2
(45) Date of Patent: Aug. 29, 2023

(54) CONVERSION AND MIGRATION OF KEY-VALUE STORE TO RELATIONAL MODEL

(71) Applicant: ORACLE INTERNATIONAL CORPORATION, Redwood Shores, CA (US)

(72) Inventor: Onur Senturk, Amsterdam (NL)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/468,017

(22) Filed: Sep. 7, 2021

(65) Prior Publication Data

US 2023/0075443 A1    Mar. 9, 2023

(51) Int. Cl.
  *G06F 16/28* (2019.01)
  *G06F 16/245* (2019.01)
  (Continued)

(52) U.S. Cl.
  CPC .............. *G06F 16/288* (2019.01); *G06F 9/54* (2013.01); *G06F 16/212* (2019.01);
  (Continued)

(58) Field of Classification Search
  CPC .... G06F 16/288; G06F 16/212; G06F 16/215; G06F 16/221; G06F 16/2237;
  (Continued)

(56) References Cited

U.S. PATENT DOCUMENTS

| 9,626,411 B1 | 4/2017 | Chang et al. |
| 9,864,816 B2 | 1/2018 | Liu et al. |
| (Continued) | | |

FOREIGN PATENT DOCUMENTS

| CN | 105912665 B | 4/2016 |
| CN | 103530327 B | 8/2016 |

OTHER PUBLICATIONS

Aftab et al.; Research Article—Automatic NoSQL to Relational Database Transformation With Dynamic Schema Mapping; Hindawi—Scientific Programming, Valume 2020, Article ID 8813350, 13 pages, https://doi.org/10.1155/2020/8813350.
(Continued)

*Primary Examiner* — Dangelino N Gortayo
(74) *Attorney, Agent, or Firm* — Kraguljac Law Group, LLC (57) ABSTRACT

Systems, methods, and other embodiments associated with migrating key-value data to a relational database. A method comprises retrieving a namespace from a key-value store and querying the key-value store for all kinds associated with the namespace. For a first kind, retrieving all entities associated with the namespace and the first kind and generating an entity list including an entry for each of the entities retrieved and the corresponding entity data. The entity list is traversed to identify each property name and associated property value. A relational database model is generated including a table based on the namespace and kind. Columns are defined in the table corresponding to each property name from the entity list. Data from each entity is then inserted into a table row and each property value from the entity is mapped to a corresponding column that is defined with the corresponding property name.

20 Claims, 7 Drawing Sheets

(51) Int. Cl.
*G06F 16/22* (2019.01)
*G06F 16/215* (2019.01)
*G06F 16/25* (2019.01)
*G06F 9/54* (2006.01)
*G06F 16/21* (2019.01)

(52) U.S. Cl.
CPC .......... *G06F 16/215* (2019.01); *G06F 16/221* (2019.01); *G06F 16/2237* (2019.01); *G06F 16/2282* (2019.01); *G06F 16/245* (2019.01); *G06F 16/258* (2019.01)

(58) Field of Classification Search
CPC .. G06F 16/2282; G06F 16/245; G06F 16/258; G06F 9/54
See application file for complete search history.

(56) References Cited

U.S. PATENT DOCUMENTS

| | | |
|---|---|---|
| 9,904,694 B2 | 2/2018 | Cao et al. |
| 10,318,491 B1 | 6/2019 | Graham et al. |
| 11,036,756 B2 | 6/2021 | Bussler et al. |
| 11,151,660 B1* | 10/2021 | Harding ................. G06Q 40/08 |
| 2014/0214897 A1 | 7/2014 | Zhu et al. |
| 2017/0039242 A1* | 2/2017 | Milton ................... H04W 4/02 |
| 2018/0307735 A1* | 10/2018 | Thayer .................. G06F 16/211 |
| 2019/0340273 A1* | 11/2019 | Raman ................... G06F 16/27 |
| 2020/0233905 A1* | 7/2020 | Williams .............. G06F 16/904 |
| 2020/0272620 A1 | 8/2020 | Zhang et al. |
| 2020/0285619 A1* | 9/2020 | Teyer .................... G06F 16/211 |
| 2020/0320091 A1* | 10/2020 | Wu ..................... G06F 16/2246 |

OTHER PUBLICATIONS

Leandro Duarte Pulgatti; Data Migration Between Different Data Models of NOSQL Databases; Curitiba 2017; pp. 1-80; https://acervodigital.ufpr.br/bitstream/handle/1884/49087/R%20-%20D%20-%20LEANDRO%20DUARTE%20PULGATTI.pdf?sequence=1&isAllowed=y.

Biswajit Maity et al.; A Framework to Convert NoSQL to Relational Model; pp. 1-6; ACIT 2018: Proceedings of the 6th ACM/ACIS Intl. Conference on Applied Computing and Information Technology, Jun. 2018; https://dl.acm.org/doi/abs/10.1145/3265007.3265011.

Notice of Allowance from U.S. Appl. No. 17/539,603, filing date of Dec. 1, 2021, dated Jan. 20, 2023, 21 pgs.

* cited by examiner

100

"key":{"partitionId":{"projectId":"xyz.datastore","namespaceId":"stage.xyz.com"},"path":[{"kind":"AbandonCall","id":"1234567890"}]},"properties":{"activecallkey":{"stringValue":"FwsSCkFjdGl2ZUNhbGwYgICAhc2SoQsMogEVc3RhZ2luZzEuYWxvLXRIY2guY29t"},"queue":{"keyValue":{"partitionId":{"projectId":"xyz.datastore","namespaceId":"stage.xyz.com"},"path":[{"kind":"Queue","id":"56789012345"}]}},"callbackuser":{"nullValue":null},"calldate":{"timestampValue":"2021/03/13T15:35:43Z"},"status":{"stringValue":"Repeat Call"},"waitduration":{"nullValue":null},"date":{"timestampValue":"2021/03/13T15:35:48Z"},"callkey":{"stringValue":"LXRIc3RyEQsSBENhbGwYgICA2c4gsMogEVc3RhZ2luZzEuYWxvLXRIY2guY29t"},"callerid":{"stringValue":"88876543210"},"callbackkey":{"nullValue":null},"callbackdisposition":{"nullValue":null},"callbackdate":{"nullValue":null}}}

***Get Namespaces

```java
public static java.util.List<String> getNamespaces() { if (datastore == null) {
       try {
                    datastore = getDatastoreConnection();
       } catch (Exception e) {
                    e.printStackTrace();
       }
    } if (datastore == null)
                    System.exit(0);

KeyFactory keyFactory = datastore.newKeyFactory().setKind("__namespace__");
    Key startNamespace = keyFactory.newKey("a");
    Key endNamespace = keyFactory.newKey("z" + 1);
    Query<Key> query = Query
                    .newKeyQueryBuilder().setKind("__namespace__").setFilter(CompositeFilter
                    .and(PropertyFilter.gt("_key_", startNamespace),
                    PropertyFilter.lt("_key_", endNamespace)))
                    .build();
    java.util.List<String> namespaces = new ArrayList<>();
    QueryResults<Key> results = datastore.run(query);
    while (results.hasNext()) {
                    String temp = results.next().getName();
                    namespaces.add(temp);
                    System.out.println(temp);
    }
    return namespaces;

\*\*\*Get Kinds for each Namespace \*\*\*

```
public static ArrayList<String> getKindsForNamespace(String ns) {
                if (datastore == null) {
                   try {
                                datastore = getDatastoreConnection();
                   } catch (Exception e) {
                                e.printStackTrace();
                   }
                }
                if (datastore == null)
                                System.exit(0);

if (ns.equalsIgnoreCase(""))
                                ns = default_namespace;
                System.out.println("namespace:" + ns);

// Query<Key> query = Query.newKeyQueryBuilder().setNamespace(ns).build();
                Query<Key> query = Query.newKeyQueryBuilder().build();
                ArrayList<String> kinds = new ArrayList<>();
                QueryResults<Key> results = datastore.run(query);
                while (results.hasNext()) {
                                String tempKind = results.next().getName();
                                if (tempKind != null && tempKind.indexOf("_") != -1) {
                                                StringTokenizer t = new StringTokenizer(tempKind, "_");
                                                String kind = "";
                                                while (t.hasMoreTokens())
                                                                kind = t.nextToken();

if (!kinds.contains(kind))
                                                                kinds.add(kind);
                                }
                }
                System.out.println("# of Kinds " + kinds.size());
                return kinds;
}
```

CONVERSION AND MIGRATION OF KEY-VALUE STORE TO RELATIONAL MODEL

BACKGROUND

NoSQL is a non-relational database that is structured as a key-value store. Data is stored and accessed using key-values where each item is stored with a key. A key-value store is unstructured such that each object or record of data may have different fields or a different number of fields. In general, the key-value store is a schema-less data model because the data does not have to conform to a pre-defined structure that is created for the database.

A relational database model is a different data structure that requires schema. The schema defines the structure and organization of the data. Data is organized in data tables with predefined fields organized in columns and rows. Each field has a pre-defined data type. Since the relational database model is schema-based, it requires data to conform to the schema explicitly defined for the relational database in order to store the data correctly.

Migrating data from an unstructured key-value store to a structured relational database is problematic due to the unknown organization of data in the key-value store. A technique for generating a relational data structure from a key-value store provides advantages for data migration.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Systems and methods are described herein that may automatically convert and migrate a key-value store to a relational database model. In one embodiment, the present system queries and analyzes the data in the key-value store in its native format (e.g., Java format) to identify namespaces, kinds, and entities. Data types of the data may be determined. A relational database model is generated with schema based on the identified namespaces, kinds, and entities. This creates a mapping between the key-value data to columns and rows in the relational model. Data types of the key-value data are mapped to valid data types in the relational model. The key-value data may then be migrated to the relational database based on the mappings using scripts that insert the key-value data into correct columns and rows.

The present migration system provides an improved technique for data migration. Previously, it was very difficult to migrate unstructured key-value data since the organization and data types were unknown, which caused many errors in attempted migrations. Other previous techniques performed additional procedures which required additional time and were error-prone. For example, one prior technique first converted and exported key-value data from its native Java format to JSON format (JavaScript Object Notion). Then the JSON formatted data was parsed and converted to a relational model. Algorithms that parsed JSON formatted data were not able to accurately identify certain data when the data was in nested JSON objects or nested fields. Many nested fields were lost or not seen by the algorithms, which caused many errors and/or inaccuracies in the data migration. The present technique eliminates the need to analyze and discover nested JSON objects and fields. By analyzing the native format of the key-value store, all data is accurately retrieved and identified for migration.

Figure 1:
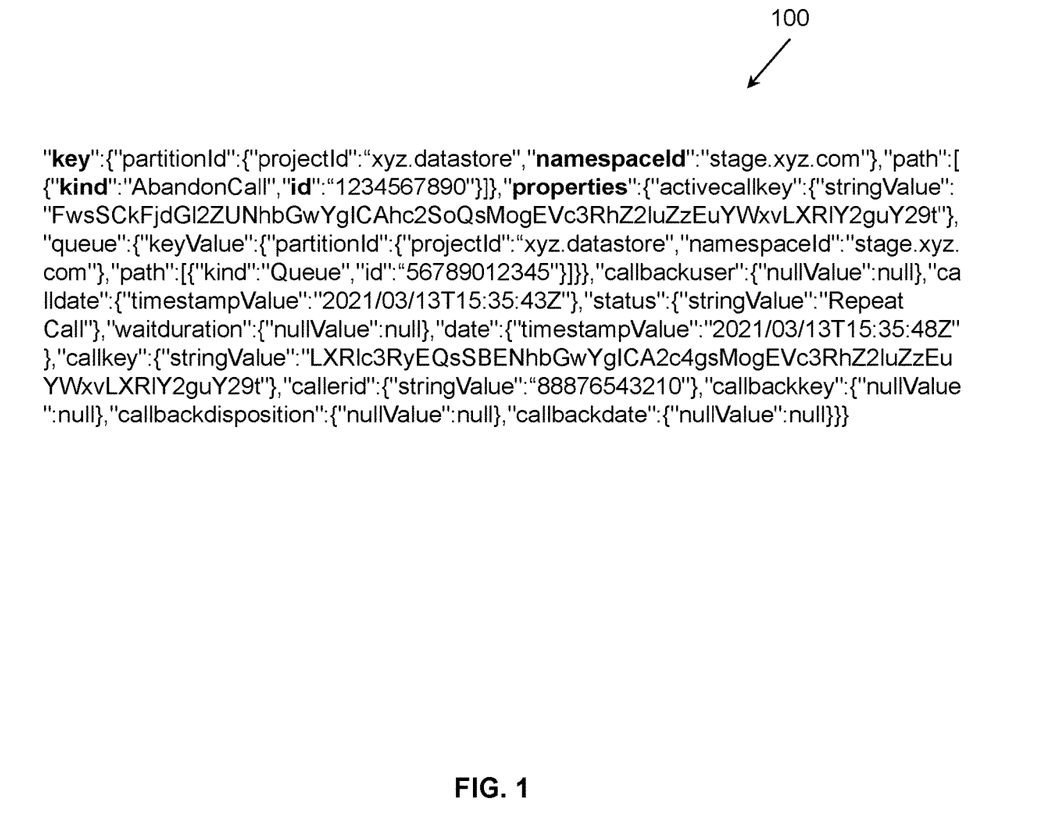
FIG. 1 illustrates an example of a single entity in key-value form.

With reference to FIG. 1, an example of one entity 100 stored in key-value format is illustrated. In one embodiment, the present migration system is configured to migrate data from a key-value format with the following configuration of entities. Data objects in the store are referred to as "entities." Entity 100 is one data object and is a string of data that defines the entity. A datastore may have millions of entities.

Each entity includes a "key" that uniquely identifies the entity. The "key" may be formed by multiple fields including for example: a "namespace" of the entity; a "kind" of the entity; and an "identifier" for the specific entity. Thus, in one embodiment, the complete key for identifying an entity includes a sequence of namespace-kind-identifier. The "namespace" serves as a high-level unique identifier that allows for multitenancy. Different partitions in the data store can be created and kept separate by using different namespaces. For example, all data entities that belong to company ABC may be assigned a unique namespace, for example, "ABCnamespace" or other unique string. All data entities that belong to company XYZ are assigned a different namespace such as "XYZnamespace," or other unique string. Each data entity can only belong to one namespace. Thus, by using a specified namespace, all the key-value data that belongs to a selected group can be identified and retrieved.

The "kind" of the entity categorizes the entity within a namespace, which allows similar types of data to belong to the same category for query purposes (e.g., kind=employees). The "identifier" for the specific entity may be a "key name" string or an integer numeric ID.

Data values associated with the entity are defined as one or more "properties." Each property has a property name and one or more values that are associated with the property. For example, "firstname=John" has the property name "firstname" and the value of "John."

An entity may also have a "path" that designates another entity as its ancestor parent in a hierarchy structure. The path maybe used to locate the entity within the hierarchy. If an entity is a root entity, the path is empty and the entity's key includes simply it's kind and identifier.

In FIG. 1, the entity 100 has a key that includes the fields starting with "key" up to but not including "properties":

```
"key":{"partitionId":{"projectId":"xyz.datastore","namespaceId":"stage.xyz.com"},
"path":[{"kind":"AbandonCall","id":"1234567890"}]}
```

The entity 100 has the namespace "stage.xyz.com" and the "kind" is "AbandonCall" with an ID that uniquely identifies the entity. These fields are then followed by one or more "properties" which are the actual data values of the entity. Each property has a property name and one or more values such as the property name "activecallkey" and its string value of "FwsSCk . . . Y29t" as seen in FIG. 1.

In the example entity 100, it also includes a partition ID, which is optional. The partition ID is used to identify a grouping of entities. The grouping is defined by project and namespace. The partition ID contains dimensions including a project ID and a namespace ID. The project ID is a string ID of the project to which the entity belongs, and the namespace ID is a string ID of the namespace to which the entity belongs. Partition IDs are not used in the present discussion.

To retrieve an individual entity from the key-value data store, an application requesting the entity would use the entity's key. To retrieve one or more entities, the application can issue a query based on the keys or property values of the entities.

In other embodiments, the entity 100 may have a different key-value configuration of fields. For a different key-value configuration, the present migration system as described herein may be modified accordingly to such configuration.

In one embodiment, the present migration system is based on a mapping between key-value data types to relational structures as follows:

Key-value "namespace" maps to schema of a relational table;

Key-value "kind" maps to a relational table (e.g., its table name);

Key-value "entity" maps to a row of data in the relational table including:

Key-value "property names" (of the entity) map to column names in the relational table; and Key-value "property values" (of the entity) map to the row of the entity and are stored in the column names corresponding to the property name of the property value.

Figure 2:
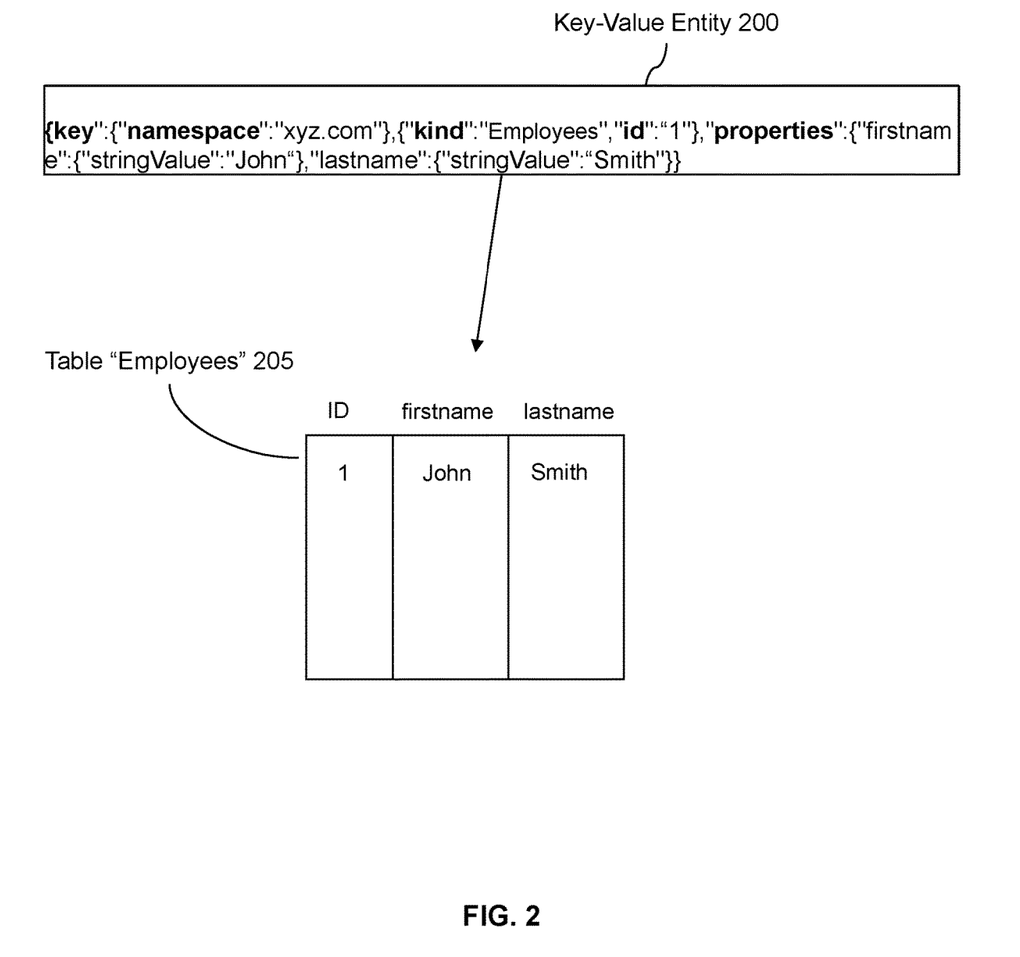
FIG. 2 illustrates simplified example of a single entity in key-value form and a migration to a relational table, in one embodiment.

With reference to FIG. 2, a very simple example of a key-value entity 200 is shown to illustrate a sample mapping to a relational table 205. As stated previously, a key-value store may have millions of entities and each entity may have different fields and different properties, which creates a more complex migration task. All entities that belong together (e.g., are grouped together) in the key-value store can be determined from the entities that have the same namespace and kind. In entity 200, the "kind" is "employee" and once this is identified by the migration system, the migration system will generate a relational table with the table name "employee" 205. This is described in more detail in later sections. Entity 200 will become one row in the employee table 205 corresponding to ID "1." Properties names "firstname" and "lastname" are mapped to column names in the table 205 with their corresponding values "John" and "Smith." With this introductory explanation, the operation of the present migration system is described with reference to FIG. 3.

Figure 3:
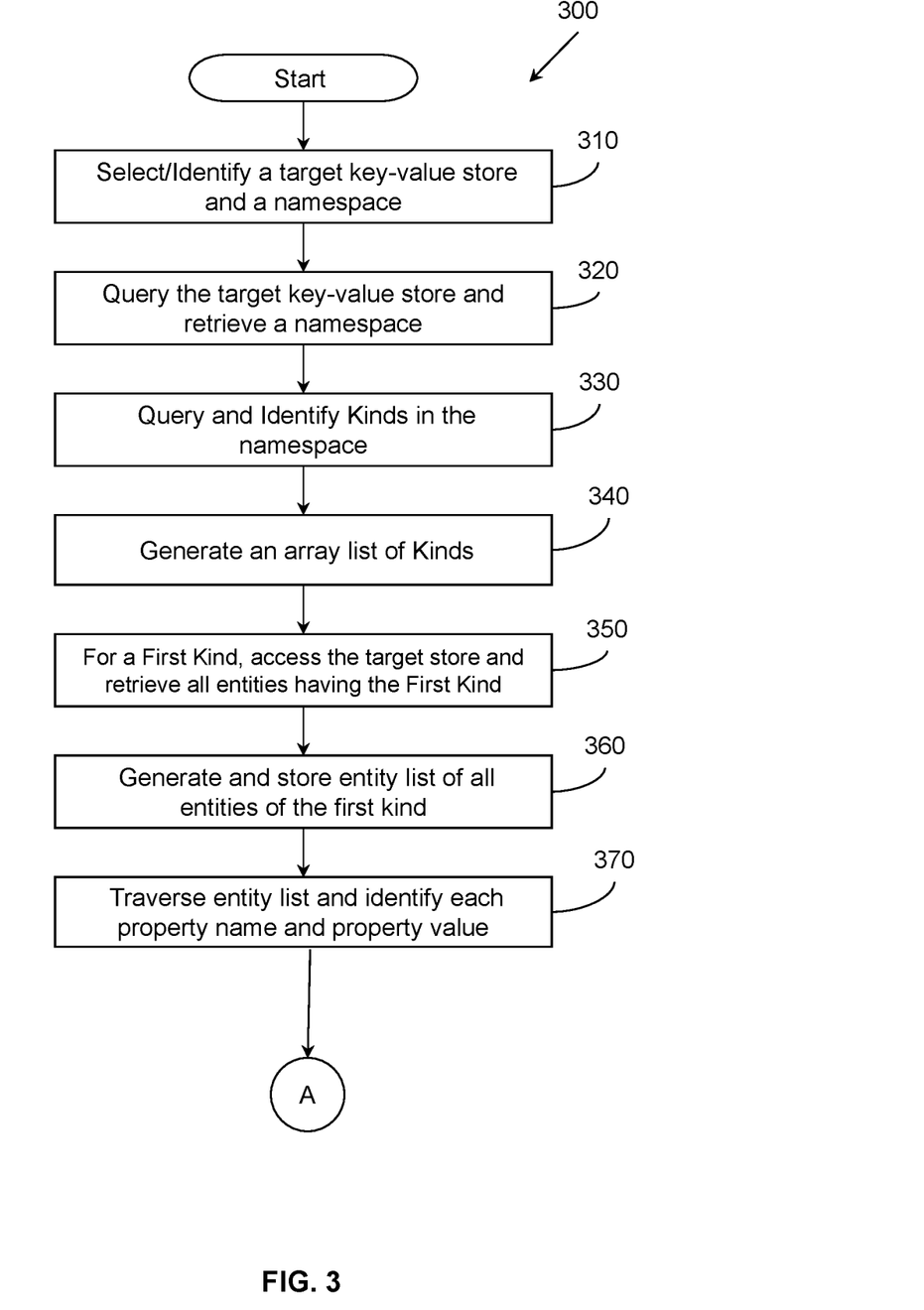
FIG. 3 illustrates one embodiment of a method associated with discovering entities and properties from a key-value store that will be migrated.

With reference to FIG. 3, one embodiment of a migration method 300 is illustrated that is associated with migrating data from a key-value store to a relational database model. In one embodiment, the method 300 is an algorithm executed by a computing device. Method 300 will be described based on the key-value structure of the entity 100 and/or entity 200 describe above. The method 300 may include two phases where a first phase (shown in FIG. 3) involves discovering and identifying the fields and data objects of the key-value store. A second phase (shown in FIG. 4) involves generating a corresponding relational database model and migrating the key-value data into appropriate tables, columns, and rows in the relational database model.

At block 310, a target key-value store is selected and/or identified for migration. This may include identifying the target key-value store from a cloud system or other data repository by its name and identifying a namespace within the key-value store. A key-value store may have one namespace or may have hundreds of different namespaces. In one embodiment, a namespace is used to partition data within the key-value store, which may be used to support multitenancy. For example, different clients/organizations called tenants can have their data in separate data partitions that are identified by their assigned namespace. Each entity (data object) in the key-value store belongs to one namespace. Thus, all entities (all data objects) in the key-value store that belong to one client can be found by its namespace. In general, the namespace is a unique identifier that groups all data that is assigned to the same namespace.

An administrator with knowledge of the target key-value store will know and select a target namespace that is the target of the migration. To simplify the discussion, method 300 will be described with reference to migrating key-value data associated with a single namespace. In another embodiment, if multiple namespaces and/or all namespaces are targeted for migration, the method 300 may be configured to be performed by collecting the selected namespaces and performing method 300 iteratively for each namespace.

Figure 5:
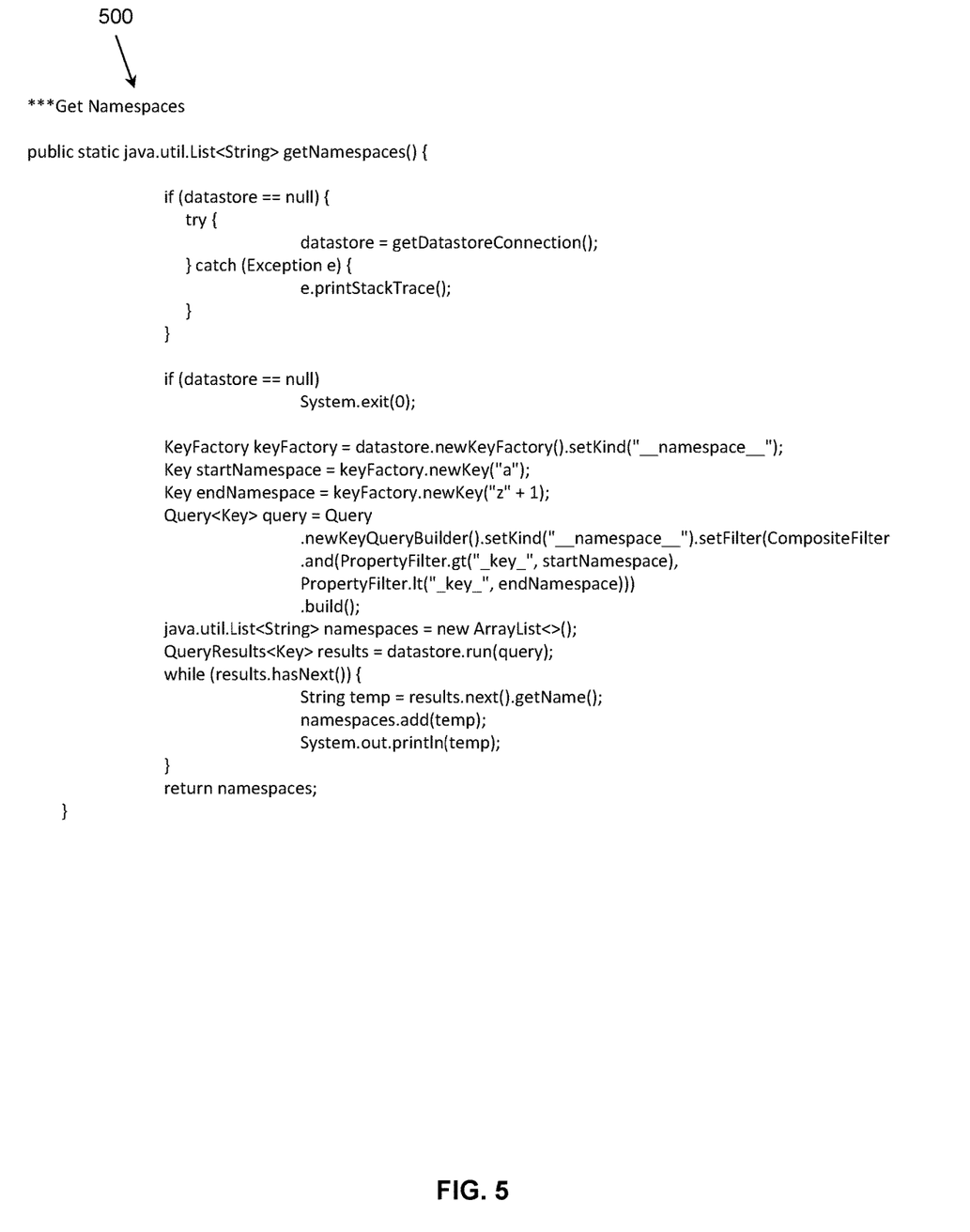
FIG. 5 illustrates one embodiment of a script identifying and retrieving namespaces from a key-value store.

At block 320, the key-value store is queried to retrieve the target namespace. If multiple namespaces are to be included, then the algorithm queries the key-value store to identify all the defined namespaces. The retrieved namespaces may then be stored in an array list. FIG. 5 illustrates one embodiment of a Java-based algorithm 500 that queries and retrieves all the namespaces from a datastore. The resulting namespaces are stored in an array list and/or outputted to a display screen (e.g., by the System.out.println function in FIG. 5). The present method is not limited to the specific algorithm of FIG. 5.

With reference again to FIG. 3 at block 330, based on the selected target namespace, all the "kinds" that are defined in the namespace are identified. There may be one or more kinds in a namespace. A "kind" that is assigned to an entity is used to categorize the entity and thus similar entities can all have the same category of data (e.g., employee names, recalled items, other category). The kind can be used to query data that belongs to a certain category. As explained below, the migration method 300 will map a "kind" to a "table" in the relational model.

Figure 6:
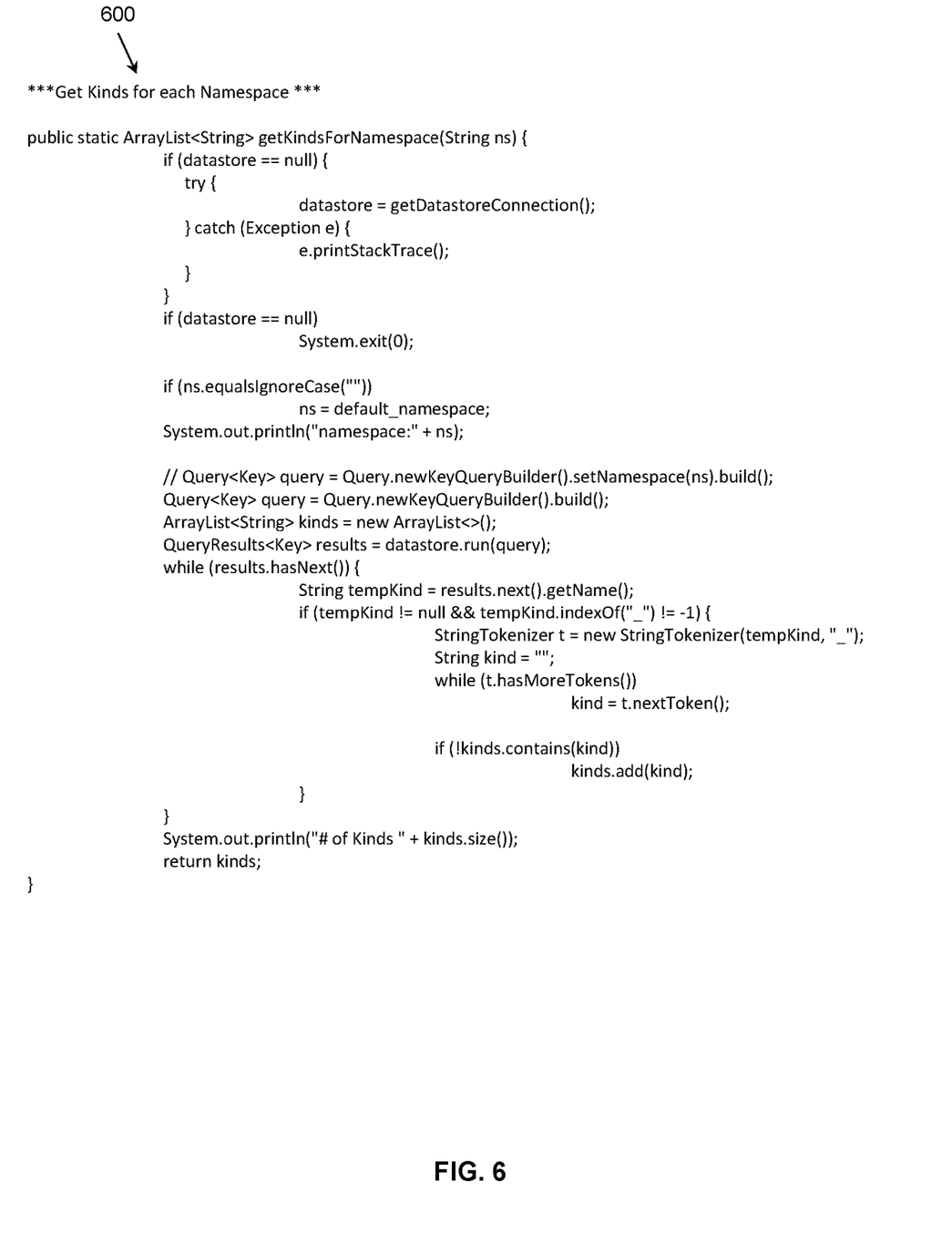
FIG. 6 illustrates one embodiment of a script to get "kinds" for a namespace from the key-value store.

In one embodiment, to identify the "kinds," the method 300 issues a query to the key-value store to retrieve all kinds that are associated with the target namespace. This may include using a pre-defined query function/method that is provided by a host system of the key-value store via APIs. For example, one type of query function is Query<key> query={conditions} based on specified parameters and/or conditions. In this example, the conditions will include the namespace and the "kind" that is being searched. Other types of APIs may have other query types that may be used. FIG. 6 illustrates one embodiment of a Java-based algorithm 600 to get all the kinds for a target namespace from a datastore. In algorithm 600, the target namespace is stored in a variable string "ns." Algorithm 600 is also configured to iteratively process multiple namespaces "ns" (if they exist in the namespace array list) and retrieve all the kinds associated with each namespace.

At block 340, a kind array list is defined and/or generated. Each "kind" that is identified and retrieved is stored in the kind array list. One array list stores only the kinds for a single namespace. In general, a "kind" is assigned a string value that identifies the "kind." For example, from FIG. 1, the kind is "AbandonCall" and from FIG. 2, the kind is "Employees." Thus, the kind array list stores the string value of each kind identified from the query.

At block 350, the method retrieves all data entities that are associated with a single kind. Thus, all entities in the key-value store that are categorized by the same "kind" will be retrieved. A single kind will be mapped to a single table in the migrated relational database. The following discussion is based on the "first kind" that is taken from the kind array list. The process may be repeated for each kind in the kind array list. Each different "kind" will be mapped to a different table in the relational model.

For the first kind, the method queries the key-value store using the target namespace and the first kind. This query may use an API that is available from the host system of the key-value store. The query result returns all the data entities in Java native format that belong to the target namespace and the first kind. Each retrieved entity is stored in an entity list the holds the data for later processing. The entity list may be a generated in the form of an array, a file, or other data structure stored in memory or storage device (block 360). The complete entity list will include all the key-value data that will be migrated for a specified "kind" which in this example is the first kind.

At block 370, now that all the entity data associated with the first kind is retrieved, the entity list is parsed and traversed. The parsing searches for each key-value pair from the "properties" of each entity. This includes identifying each property name and associated property value. At stated previously, since key-value data is not uniformly structured, some entities may have one property name-value pair while other entities may have hundreds of property name-value pairs.

Once the parsing traverses all the entities and all the property name-value pairs are identified, each unique property name is identified. For example, all the identified property names are stored in memory/storage and evaluated for duplicate names. Duplicate names are deleted. Thus, the property names are consolidated to create a list of unique property names with no duplicates. Note, the duplicate property names are not deleted from the entity data itself in the entity list.

The consolidation function may also be performed as each entity is parsed on the fly. Each identified property name from the parsed entity is placed in the list of unique property names if the identified property name does not already appear in the list. Thus, the final consolidated list does not contain duplicate property names. Since the property names will define columns in the relational table, the consolidated list ensures that the table does not include duplicate column names, which would cause an error.

Method 300 then proceeds to the second phase (FIG. 4) that builds the relational database model and migrates the data from each entity to the relational model.

Figure 4:
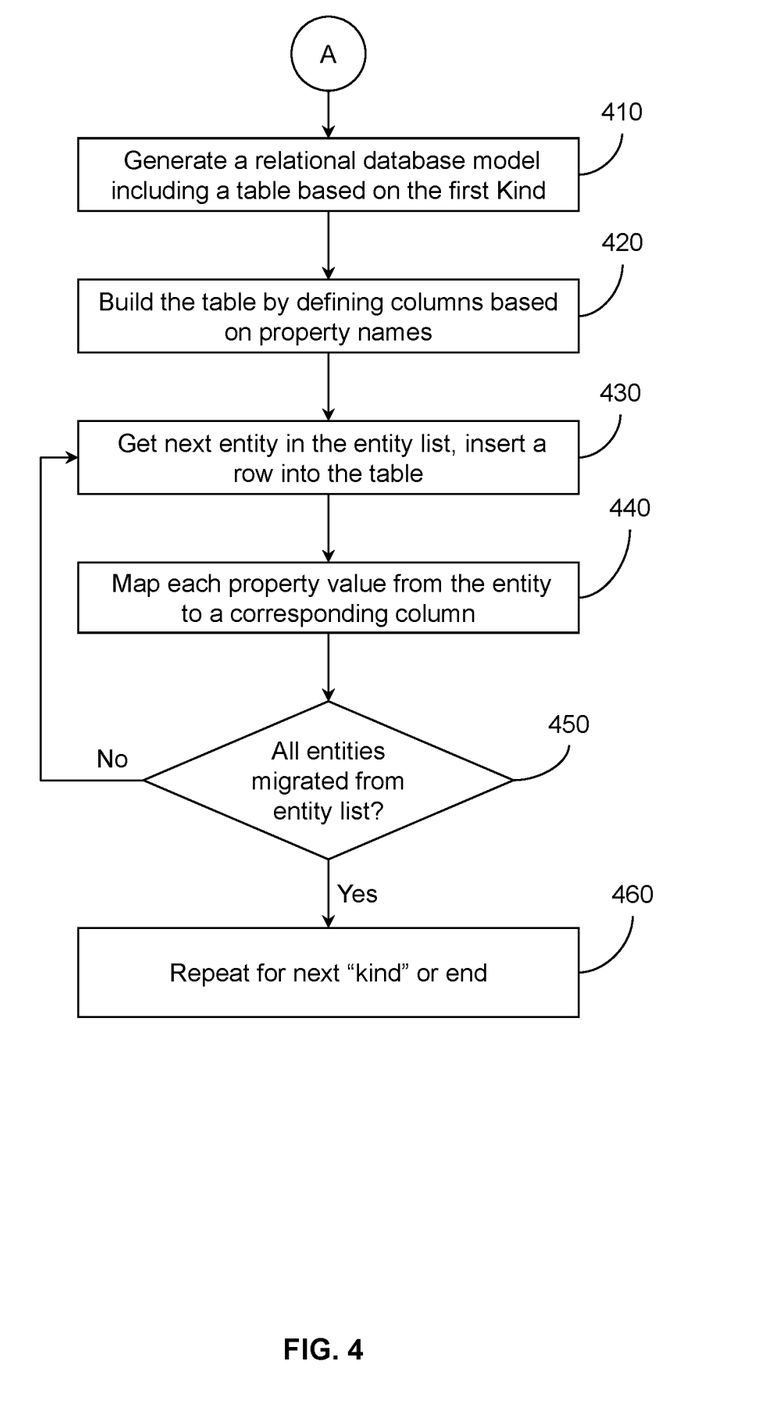
FIG. 4 illustrates an embodiment of second phase of FIG. 3 associated with generating a relational table and migrating the key-value data.

With reference to FIG. 4, at block 410, a relational database model is generated based on the discovered fields of the target namespace, the kind, and the property names. For example, the relational database model is created and defined as a table that assigns the namespace as schema of the table and assigns the first kind as a table name.

In one embodiment, the functions to create the table are implemented as an executable script (e.g., a create table script) that includes a "create table" command based on the namespace and the first kind. The string values of the namespace and the first kind are passed as parameters to the create table script. This may be performed by code in the create table script that is configured to automatically read the string value of the namespace from a stored namespace variable, or from the next position in an array list of namespaces (if multiple namespaces are being migrated). The code is further configured to read the string value of the first kind from the next position in the array list of kinds (in this example, the first position). The create table script is then executed in a relational database system of the destination system where the migrated data will reside. The table script creates a relational table based on at least the parameters of the namespace and the first kind.

At block 420, the relational table is further built by defining columns of the table based on the property names from the list of property names identified previously. Thus, for each unique property name found from the entity list, a column is defined with the same string name as the property name. Thus, if property names include "first name," "last name," and "address," then the created table will include column names of "first name," "last name," and "address." In one embodiment, these actions are implemented in the create table script to define the columns of the table. All the unique property names that were found are passed as parameters to the script or are iteratively read out from the list of property names by the create table script code.

In another embodiment, the relational model may have reserved words that cannot be used as column names in a table. If any property names match a reserved word, then the process takes steps to change the property name so that it does not match any reserved words. For example, as the table script reads each property name from the list of property name, the property name is compared to any reserved words. If there is match, the property name is changed by, for example, adding a character to the name or other modification. This is explained in more detail below.

At block 430, after the relational table is created with the set of columns, the method iteratively processes through the entities in the entity list. Each entity is inserted as a row in the relational table (e.g., entity 1 is inserted into row 1, entity 2 is inserted into row 2, etc.). In particular, each entity is parsed to identify the property name-value pairs. Each property value is mapped from the entity to a corresponding column in the table that is defined with the corresponding property name of the property value.

For example, if a property name-value pair is "first name=John" then the value "John" is inserted in the current table row of the entity in the column name of "first name." This repeats for each property name-value pair in the entity.

In one embodiment, the process of inserting rows is implemented by an insert script that is configured to iteratively access and traverse the entity list (e.g., array list, file, or other data structure) that holds all the retrieved entities. The insert script is configured to perform the functions described above including blocks 430, 440, and 450 of FIG. 4. The insert script is then executed in a relational database system of the destination system where the migrated data will reside. In general, the insert script is executed after the execution of the create table script.

In one embodiment, after all property values from the entity are inserted into the table row, the process checks for any missing column values. As stated previously, entities can have different numbers of property name-value pairs. Some entities may have one pair while other may have hundreds of pairs. This means that the relational table may have hundreds of columns, one column for each of the unique property names that were discovered while parsing the entity data.

Thus, if an entity does not include property values that map to all the columns in a row, that results in missing data values. In that case, the insert script is configured to automatically fill the missing column values with default values or null values, which ever is appropriate for the type data in the missing column. In general, each table column in a row needs to have a value. This is different from key-value stores where an entity does not need to have a value for every possible property name in the associated "kind."

At block 450, after the current table row is completed for the current entity, the method goes to block 430 to repeat for the next entity. The next entity is read from the entity list and parsed. A new row is inserted into the table with the property values from the next entity and the process repeats for every entity in the entity list. When all the entities from the entity list are processed and no more entities remain, the migration of the key-value data for the current "kind" is complete.

The array list of kinds may then be checked to determine if additional "kinds" have been stored in the array list (from block 340 in FIG. 3). If there are additional "kinds" to migrate, the method repeats to process the next "kind" and migrate its entities into a new relational table using the same process. For example, for each kind in the array list of kinds, extract the next string value from the array list associated with the next kind and create a new relational table with the string value as a table name. The process then repeats from block 350 in FIG. 3 where all entities in the target namespace that have the next "kind" value are retrieved from the key-value store and inserted into rows in the new table as explained previously.

Data Type Validation Embodiment

In another embodiment, the migration system/method performs a data type validation to ensure that the data types from the migrated data will be mapped to valid data types in the relational data table. It is possible that the key-value store includes data types that do not exist or are otherwise invalid in the relational table. Therefore, invalid data types from the key-value store cannot be defined for the relational table.

The data type validation may be performed when the table is being created and its columns are defined. During table creation, each column in the table is defined with a specified data type. Thus, the data values that are inserted/stored in a column must be of the specific data type. In one embodiment, the create table script is configured to verify data types from the key-value entity data.

Recall that columns in the table correspond to identified property name-value pairs from the entity list. While entity data is traversed (from the entity list) and when each property name and value is identified from an entity, the data type of the property name and value is determined. Example data types from a key-value store may include string, text, key, null, timestamp, Long (number), Double (number), Integer, Boolean, and list.

When the data type of a property name-value pair does not exist in the target relational table being built, then the data type is mapped (converted) to a similar existing valid data type for the relational table. For example, if the key-value data type is "Long" or "Integer" and these types are not valid in the relational table, the data type is converted to an existing similar data type such as "Number." Thus, the create table script may be configured to include code that checks for known invalid data types and reassigns those data types to similar valid data types in the relational table.

In another embodiment, a data integrity check is performed and fixed if an error occurs. For example, when the data migration creates a relational table but then an error occurs, the migration for that table needs to start over. However, the database system does not permit the creation of a new table with a table name that already exists in the database (e.g., the errored-out table has been created and has the same table name). Thus, the migration system is configured to automatically delete the errored-out table from the database system in response to an error. In this manner, the errored-out table is deleted and does not exist before the process restarts and creates a new table with the same table name.

Cloud or Enterprise Embodiments

In one embodiment, the present migration system is a computing/data processing system including an application or collection of distributed applications for enterprise organizations. The applications and computing system 100 may be configured to operate with or be implemented as a cloud-based networking system, a software as a service (SaaS) architecture, or other type of networked computing solution. In one embodiment the migration system is a centralized server-side application that provides at least the functions disclosed herein and that is accessed by many users via computing devices/terminals communicating with the computing system 100 (functioning as the server) over a computer network.

In one embodiment, one or more of the functions and/or components described herein are configured as program modules stored in a non-transitory computer readable medium. The program modules are configured with stored instructions that when executed by at least a processor cause the computing device to perform the corresponding function (s) as described herein.

Computing Device Embodiment

Figure 7:
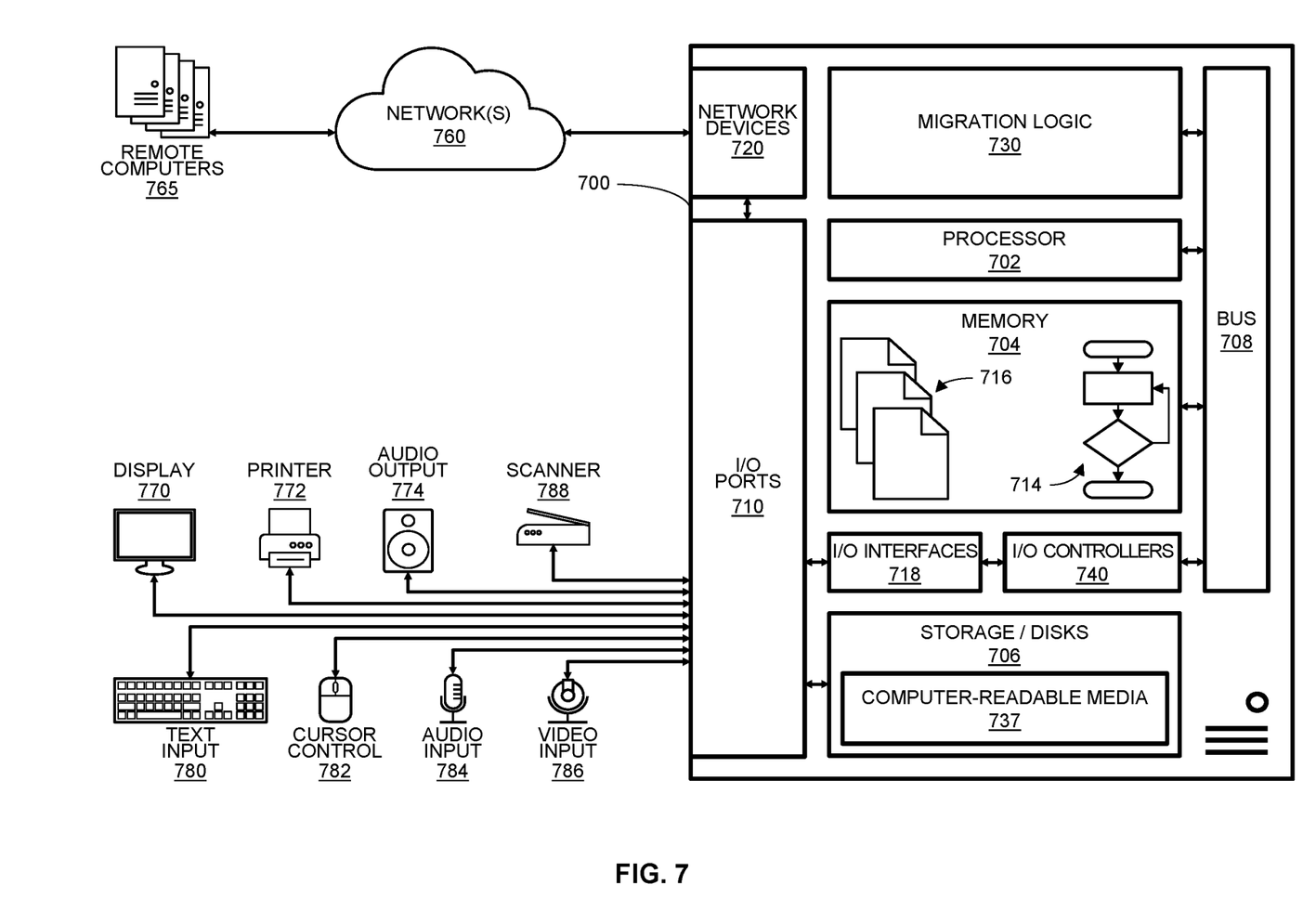
FIG. 7 illustrates an embodiment of a computing system configured with the example systems and/or methods disclosed herein.

FIG. 7 illustrates an example computing device that is configured and/or programmed as a special purpose computing device with one or more of the example systems and methods described herein, and/or equivalents. The example computing device may be a computer 700 that includes at least one hardware processor 702, a memory 704, and input/output ports 710 operably connected by a bus 708. In one example, the computer 700 may include migration logic 730 configured to facilitate data migration from a key-value store to a relational database table(s) as described by the methods of FIG. 3 and FIG. 4.

In different examples, the logic 730 may be implemented in hardware, a non-transitory computer-readable medium 737 with stored instructions, firmware, and/or combinations thereof. While the logic 730 is illustrated as a hardware component attached to the bus 708, it is to be appreciated that in other embodiments, the logic 730 could be implemented in the processor 702, stored in memory 704, or stored in disk 706.

In one embodiment, logic 730 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform the data migration technique as described herein. The means may also be implemented as stored computer executable instructions that are presented to computer 700 as data 716 that are temporarily stored in memory 704 and then executed by processor 702.

Migration logic 730 may also provide means (e.g., hardware, non-transitory computer-readable medium that stores executable instructions, firmware) for performing the data migration technique as described herein.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A storage disk 706 may be operably connected to the computer 700 via, for example, an input/output (I/O) interface (e.g., card, device) 718 and an input/output port 710 that are controlled by at least an input/output (I/O) controller 740. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The computer 700 may interact with, control, and/or be controlled by input/output (I/O) devices via the input/output (I/O) controller 740, the I/O interfaces 718, and the input/output ports 710. Input/output devices may include, for example, one or more displays 770, printers 772 (such as inkjet, laser, or 3D printers), audio output devices 774 (such as speakers or headphones), text input devices 780 (such as keyboards), cursor control devices 782 for pointing and selection inputs (such as mice, trackballs, touch screens, joysticks, pointing sticks, electronic styluses, electronic pen tablets), audio input devices 784 (such as microphones or external audio players), video input devices 786 (such as video and still cameras, or external video players), image scanners 788, video cards (not shown), disks 706, network devices 720, and so on. The input/output ports 710 may include, for example, serial ports, parallel ports, and USB ports.

The computer 700 can operate in a network environment and thus may be connected to the network devices 720 via the I/O interfaces 718, and/or the I/O ports 710. Through the network devices 720, the computer 700 may interact with a network 760. Through the network, the computer 700 may be logically connected to remote computers 765. Networks with which the computer 700 may interact include, but are not limited to, a LAN, a WAN, and other networks.

DEFINITIONS AND OTHER EMBODIMENTS

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method performed by a computing device, the method comprising:
    querying a key-value store and retrieving a namespace;
    identifying one or more kinds that are defined in the namespace by querying the key-value store for all kinds associated with the namespace;
    generating an array list of all the one or more kinds that are identified;
    for a first kind from the array list:
        accessing the key-value store and retrieving all entities associated with the namespace and the first kind;
        generating an entity list including an entry for each of the entities retrieved wherein the entry includes corresponding entity data from a given entity;
        after all the entities for the first kind are retrieved, traversing the entity list and identifying each property name and associated property value;
    generating a relational database model including a table that assigns the namespace as schema of the table and assigns the first kind as a table name;
    building the table in the relational database model by defining a plurality of columns, wherein a column is defined for each property name from the entity list; and
    for each entity in the entity list, iteratively inserting a row into the table and mapping each property value from the entity to a corresponding column that is defined with the corresponding property name of the property value.

2. The computer-implemented method of claim 1, wherein accessing the key-value store and retrieving all entities associated with the namespace and the first kind includes using a query function from an API that returns data from the entities in Java native format.

3. The computer-implemented method of claim 1, further comprising:
    for each kind in the array list of the one or more kinds, extracting a string value from the array list associated with a next kind and creating a new relational table with the string value as a table name of the new relational table.

4. The computer-implemented method of claim 1, further comprising:
passing the namespace and the kind to a table script that is configured to create the table based on the namespace and the kind;
executing the table script in the relational database to create the table;
wherein iteratively inserting the row into the table includes executing an insert script that inserts a new row into the table for each entity from the entity list, and inserts each property value from the entity into a corresponding column in the table.

5. The computer-implemented method of claim 1, wherein accessing the key-value store and retrieving all entities comprises generating a query command that requests all entities that are associated with the namespace and the first kind.

6. The computer-implemented method of claim 1, wherein defining the plurality of columns in the table includes:
for each property name from the entity list, comparing the property name to one or more reserved words;
in response to the property name matching a reserved word, modifying the property name to a different name; and
naming a corresponding column in the table for the property name as the different name.

7. The computer-implemented method of claim 1, wherein traversing the entity list and identifying each property name and associated property value further includes:
generating a list of unique property names from the identified property names and deleting duplicate property names.

8. A computing system, comprising:
at least one processor connected to at least one memory;
a non-transitory computer readable medium with instructions stored thereon that when executed by at least the processor cause the processor to:
query a key-value store and retrieving a namespace;
identify one or more kinds that are defined in the namespace by querying the key-value store for all kinds associated with the namespace;
generate an array list of all the one or more kinds that are identified;
for a first kind from the array list:
access the key-value store and retrieving all entities associated with the namespace and the first kind;
generate an entity list including an entry for each of the entities retrieved and corresponding entity data;
after all the entities for the first kind are retrieved, traverse the entity list and identify each property name and associated property value;
generate a relational database model including a table that assigns the namespace as schema of the table and assigns the first kind as a table name;
build the table in the relational database model by defining a plurality of columns, wherein a column is defined for each property name from the entity list; and
for each entity in the entity list, iteratively insert a row into the table and map each property value from the entity to a corresponding column that is defined with the corresponding property name of the property value.

9. The computing system of claim 8, wherein the instructions for accessing the key-value store and retrieving all entities associated with the namespace and the first kind further includes instructions for using a query function from an API that returns data from the entities in Java native format.

10. The computing system of claim 8, wherein the instructions further include instructions that when executed by at least the processor cause the processor to:
for each kind in the array list of the one or more kinds, extract a string value from the array list associated with a next kind and creating a new relational table with the string value as a table name of the new relational table.

11. The computing system of claim 8, wherein the instructions further include instructions that when executed by at least the processor cause the processor to:
pass the namespace and the kind to a table script that is configured to create the table based on the namespace and the kind;
execute the table script in the relational database to create the table;
wherein iteratively inserting the row into the table includes executing an insert script that inserts a new row into the table for each entity from the entity list, and inserts each property value from the entity into a corresponding column in the table.

12. The computing system of claim 8, wherein the instructions for accessing the key-value store and retrieving all entities comprises instructions that when executed by at least the processor cause the processor to:
generate a query command that requests all entities that are associated with the namespace and the first kind.

13. The computing system of claim 8, wherein the instructions for defining the plurality of columns in the table further includes instructions configured to:
for each property name from the entity list, compare the property name to one or more reserved words;
in response to the property name matching a reserved word, modify the property name to a different name; and
name a corresponding column in the table for the property name as the different name.

14. The computing system of claim 8, wherein the instructions for traversing the entity list and identifying each property name and associated property value further include instructions that when executed by at least the processor cause the processor to:
generate a list of unique property names from the identified property names and deleting duplicate property names.

15. A non-transitory computer-readable medium that includes stored thereon computer-executable instructions that when executed by at least a processor of a computer cause the computer to:
convert and migrate data from a key-value store that is a non-relational database to a relational database model comprising operations of:
select a namespace identifier that is defined in a key-value store, wherein the key-value store is a non-relational database;
query the key-value store for kind categories associated with the namespace identifier and retrieve one or more kind categories associated with the namespace identifier;
for a first kind category from the array list one or more kind categories:
access the key-value store and retrieve data entities associated with both the namespace identifier and the first kind category;

traverse the data entities and identify each property name and associated property value that is found in the data entities;

generate a relational database model including a table and assign the namespace identifier as schema of the table and assign the first kind category as a table name;

build the table in the relational database model by defining a plurality of columns, wherein a column is defined for each property name identified from the data entities; and migrate data from each data entity to the table in the relational database model by, for each given data entity iteratively inserting a row into the table and mapping each property value from the given data entity to a corresponding column that is defined with the corresponding property name of the property value.

16. The non-transitory computer-readable medium of claim 15, wherein the instructions for accessing the key-value store and retrieving data entities associated with the namespace identifier and the first kind category further includes instructions for using a query function from an API that returns data from the data entities in Java native format.

17. The non-transitory computer-readable medium of claim 15, wherein the instructions further include instructions that when executed by at least the processor cause the processor to:

generate an array list of the one or more kind categories that are identified with the namespace identifier;

for each kind category in the array list of the one or more kind categories, extract a string value from the array list associated with a next kind category and creating a new relational table with the string value as a table name of the new relational table.

18. The non-transitory computer-readable medium of claim 15, wherein the instructions further include instructions that when executed by at least the processor cause the processor to:

pass the namespace identifier and the first kind category to a table script that is configured to create the table based on the namespace identifier and the first kind category;

execute the table script in a relational database to create the table;

wherein iteratively inserting the row into the table includes executing an insert script that inserts a new row into the table for each data entity retrieved, and inserts each property value from the data entity into a corresponding column in the table.

19. The non-transitory computer-readable medium of claim 15, wherein the instructions for defining the plurality of columns in the table further includes instructions configured to:

for each property name from the data entities, compare the property name to one or more reserved words;

in response to the property name matching a reserved word, modify the property name to a different name; and name a corresponding column in the table for the property name as the different name.

20. The non-transitory computer-readable medium of claim 15, wherein the instructions for traversing the data entities and identifying each property name and associated property value further include instructions that when executed by at least the processor cause the processor to:

generate a list of unique property names from the identified property names and deleting duplicate property names;

wherein the instructions further cause the processor to:

generate an entity list including an entry for each of the data entities retrieved and corresponding entity data from a data entity.

\* \* \* \* \*

UNITED STATES PATENT AND TRADEMARK OFFICE
CERTIFICATE OF CORRECTION

PATENT NO. : 11,741,134 B2
APPLICATION NO. : 17/468017
DATED : August 29, 2023
INVENTOR(S) : Senturk It is certified that error appears in the above-identified patent and that said Letters Patent is hereby corrected as shown below:

On the Title Page

Column 2, under item (56), under Other Publications, Line 3, delete "Valume" and insert -- Volume --, therefor.

In the Specification

In Column 10, Line 19, delete "on)." and insert -- on. --, therefor.

In the Claims

In Column 14, Line 63, in Claim 15, delete "the array list" and insert -- the --, therefor.

Signed and Sealed this
Eighteenth Day of June, 2024

Katherine Kelly Vidal
*Director of the United States Patent and Trademark Office*